(12) United States Patent
Guha

(10) Patent No.: US 7,292,726 B2
(45) Date of Patent: Nov. 6, 2007

(54) RECOGNITION OF ELECTRONIC INK WITH LATE STROKES

(75) Inventor: Angshuman Guha, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 892 days.

(21) Appl. No.: 10/705,202

(22) Filed: Nov. 10, 2003

(65) Prior Publication Data

US 2005/0100218 A1 May 12, 2005

(51) Int. Cl.
*G06K 9/34* (2006.01)
(52) U.S. Cl. .................................. 382/179; 382/187
(58) Field of Classification Search ................ 382/173, 382/178, 179, 186, 187, 189, 202
See application file for complete search history.

(56) References Cited

U.S. PATENT DOCUMENTS

| | | | |
|---|---|---|---|
| 5,313,528 A * | 5/1994 | Nishida | 382/23 |
| 5,392,363 A * | 2/1995 | Fujisaki et al. | 382/13 |
| 5,515,455 A * | 5/1996 | Govindaraju et al. | 382/186 |
| 5,768,417 A | 6/1998 | Errico et al. | 382/186 |
| 5,818,963 A * | 10/1998 | Murdock et al. | 382/187 |
| 6,339,655 B1 * | 1/2002 | Aharonson et al. | 382/186 |
| 6,393,395 B1 * | 5/2002 | Guha et al. | 704/232 |
| 6,512,851 B2 | 1/2003 | Navoni et al. | 382/229 |
| 6,577,755 B1 | 6/2003 | Lorie | 382/140 |
| 6,587,577 B1 | 7/2003 | Finkelstein | 382/123 |
| 2003/0086611 A1 * | 5/2003 | Loudon et al. | 382/186 |

* cited by examiner

*Primary Examiner*—Andrew W. Johns
(74) *Attorney, Agent, or Firm*—Banner & Witcoff, Ltd

(57) ABSTRACT

A method and apparatus relating to the recognition of free-form data input is disclosed. The method involves ordering writing strokes based upon spatial relationships between the strokes, and partitioning the strokes into segments. The segments are then ordered based upon spatial relationships between the segments, and the segments are analyzed to associate characters with the segments. The apparatus includes a capture interface, an ordering module, and a recognition module. The capture interface records the strokes, and the ordering module orders segments of the strokes based upon spatial relationships of the segments. The recognition module analyzes the segments and associates characters with the segments.

35 Claims, 12 Drawing Sheets

RECOGNITION OF ELECTRONIC INK WITH LATE STROKES

BACKGROUND OF THE INVENTION

1. Field of the Invention

The present invention relates to the recognition of handwritten electronic ink input in a computing device. Various examples of the invention are particularly suited to ordering and recognizing strokes and stroke segments including late strokes.

2. Description of Background Art

The use of graphical user interfaces has created a revolution in the field of computing devices. As an alternative to memorizing arbitrary or otherwise confusing commands, the individual may now manipulate software applications by simply controlling graphical objects representing their various functions and components. Rather than requiring an individual to delete a computer file with a delete command, for example, some operating systems (e.g., the Microsoft Windows® operating system) allow the individual to delete the file by dragging a graphical object representing the file to a graphical object having the appearance of a trash receptacle.

One conventional manner of manipulating software applications, controlling graphical objects rendered on a graphical user interface, or entering data involves the use of a keyboard and a pointing device, such as a mouse. The capability of manipulating software applications has been expanded, however, to allow the individual to input data through free-form data input methods, such as handwriting. For example, some software applications enable an individual to employ a stylus for writing on a digitizer, and the various data points measured by the digitizer are then collected and rendered as one or more strokes on a display. Because the strokes rendered from these data points resemble actual ink written with a pen, the data points are often referred to as electronic ink.

A stroke is a sequence of connected data points that are formed during the time period that the stylus is brought into contact with the digitizer and subsequently removed from the digitizer. Some software applications have the capacity to recognize shapes formed by the strokes by correlating the shape of a stroke with one or more specific characters.

Examples of characters include alphabetic characters, whether from the Roman, Cyrillic, Arabic, Hebrew, or Greek alphabets, for example. Furthermore, a character may be a numeral, a punctuation mark, or one of the various symbols that are commonly utilized in written text, such as ", ', (, &, @, ä, ĉ, or ę, for example. Groups of various characters may also form words. The software applications then convert the recognized shapes from one or more strokes into text data that corresponds with the characters or words. This recognition ability conveniently allows the individual to input text data into the computing device using the natural, familiar process of handwriting.

Characters generated through free-form data input methods may be formed from one or more strokes. Some characters are often formed with a single stroke, such as the characters "a", "b", and "c". Other characters, however, are formed with multiple strokes, such as the characters "i" and "t". When the individual forms words, which are combinations of characters, particularly through cursive writing, some words may be formed from a single stroke. As an example, the words "pen", "cup", and "dog" are generally formed from a single stroke when formed through cursive writing. Other words, however, are generally formed through multiple strokes. As an example, the words "pin", "cut", and "dot" each require two or more discrete strokes when formed through cursive writing. Accordingly, various characters and words (i.e., text data) may be formed through one or more discrete strokes when input through free-form data input methods.

One problem that has arisen with the use of electronic ink for the input of text data relates to the recognition of late strokes. A late stroke is a part of a character that has not been written in a conventional order during the writing of the character. An individual may delay a stroke, for example, to avoid removing the stylus from the digitizer, which would break or slow the flow of inputting text data. An example of a late stroke is the dot above the character "i", which can be written immediately after the vertical bar of the character "i", but is often written after the word, phrase, or sentence containing the character "i" has been written. That is, the individual will often form the dot above the character "i" following the formation of the remainder of the word, phrase, or sentence containing the character "i". Additional examples of strokes that are often formed as late strokes are the horizontal bar on the character "t" and the accents on various French and German characters.

Another type of late stroke forms a whole character, but is inserted before or within a previously-formed stroke. For example, the apostrophe in the word "it's" is often inserted following formation of the character series "its", particularly when formed through cursive writing. As further examples, an individual may insert a stroke that represents an opening quotation mark or an opening parenthesis following the formation of a sentence or phrase.

Because these strokes are late, it is often difficult to associate these late strokes with the other strokes to which they are related. For example, when a user crosses a "t" character with "-" stroke, it is difficult for many software applications to associate the "-" with the "t" as a result of the delay. Thus, instead of the recognized text accurately corresponding to the handwritten text, the text may include an additional "-" character after the text. Accordingly, there is a need for a method of analyzing and ordering strokes that will associate late strokes with previously-formed strokes to which the late strokes are related, so that the recognized text corresponding to the late strokes are accurately positioned.

SUMMARY OF THE INVENTION

One aspect of the invention provides methods for the recognition of electronic ink input. These methods involve ordering writing strokes based upon spatial relationships between the strokes, and partitioning the strokes into segments. The segments are then ordered based upon spatial relationships between the segments, and the segments are analyzed to associate characters with the segments.

Another aspect of the invention relates to various apparatus for recognizing electronic ink input. The apparatus includes a capture interface, an ordering module, and a recognition module. The capture interface records the strokes, and the ordering module orders segments of the strokes based upon spatial relationships of the segments. The recognition module analyzes the segments and associates characters with the segments. Various advantages and features of different examples of the invention will become more clear with reference may be made to the following descriptive matter and accompanying drawings that describe and illustrate various examples and concepts related to the invention.

DETAILED DESCRIPTION OF THE INVENTION

Overview

A conventional method of entering data into a computing device involves the use of a keyboard, wherein an individual depresses or otherwise activates keys on the keyboard to enter specific characters associated with the data. Some software applications, however, enable the individual to enter data with a stylus that contacts a digitizer. Whereas the keyboard transmits a defined signal associated with each character, data input with the stylus exhibits a more free-form structure and varies with the handwriting style and writing characteristics of different individuals. Accordingly, the specific input provided by the stylus may be substantially different for various individuals, and when a user is writing text with the stylus, the computing device must analyze the stylus input to determine the intended characters associated with the input. Although the use of a stylus is a common tool to create electronic ink, other techniques for creating electronic ink input also are contemplated as falling within the scope of the invention. For example, an individual may operate a mouse to move a pointer (e.g., a cursor) relative to a display, thereby forming electronic ink.

As discussed in the Background of the Invention section, a stroke of electronic ink is a sequence of connected data points that are formed during the time period that the stylus is brought into contact with the digitizer, continuously contacting the digitizer, and subsequently removed from the digitizer. Depending upon the handwriting style and writing characteristics of an individual, a single stroke may form a portion of a character, an entire character, portions of multiple characters, or the entirety of multiple characters. Accordingly, one or more strokes may be utilized to form an individual character or a word.

Figures 1, 2, 3, 4:
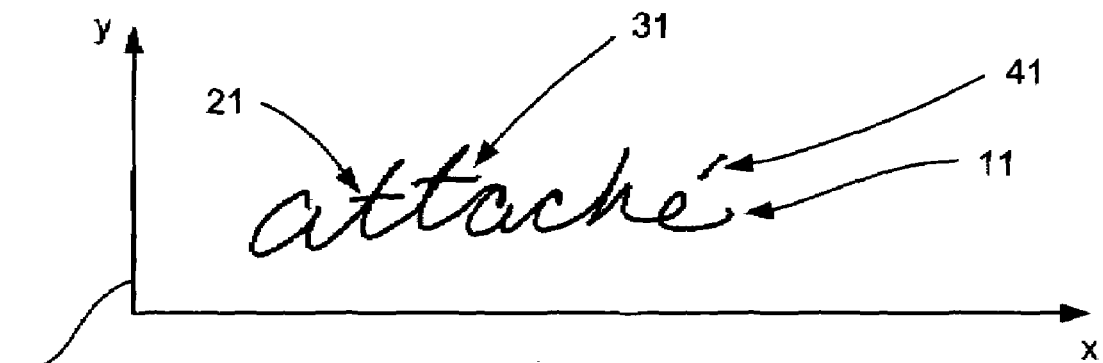
FIGS. 1-4 depict various steps in the formation of electronic ink from a plurality of strokes.

With reference to FIGS. 1-4, the various steps in the formation of a representative example of electronic ink (i.e., the word "attaché") from a plurality of electronic ink strokes is depicted. Initially, as shown in FIG. 1, a single stroke 11 forms the character "a", the portions of the two characters "t" that do not include a horizontal bar, the series of characters "ach", and the portion of the character "é" that does not include the inflection. As shown in FIG. 2, the writer then forms a stroke 21 that is the horizontal bar portion of the first character "t". Subsequently, as shown in FIG. 3, the individual forms a stroke 31 that is the horizontal bar portion of the second character "t". Finally, as shown in FIG. 4, the stroke 41 is provided to form the inflection for the character "é". The word "attaché" may, therefore, be formed from four discrete strokes 11, 21, 31, and 41.

When formed in the order discussed above, strokes 21, 31, and 41 are late strokes. As discussed above in the Background of the Invention section, a late stroke may be part of a character that has not been written in a conventional order (i.e., that is not written immediately after or during the writing of the character). Another type of late stroke forms a whole character, but is inserted before or within a previously-formed stroke. For purposes of providing a better understanding of the present invention, stroke 11 may be considered herein as a primary stroke. In general, a primary stroke is a stroke that is formed prior to late strokes but is related to the late strokes.

The order in which strokes 11, 21, 31, and 41 are formed may vary from the specific order discussed above and depicted in FIGS. 1-4. For example, the stroke 41 forming the inflection for the character "é" may be formed prior to the strokes 21 and 31 forming the horizontal bars of the two characters "t", or the stroke 31 forming the horizontal bar for the second character "t" may be formed prior to the stroke 21 forming the horizontal bar for the first character "t". The total number of strokes utilized for forming the word "attaché" may also vary depending upon the handwriting style and writing characteristics of an individual. As an example, the strokes 21 and 31 forming the two horizontal bars of the two characters "t" may be combined into a single horizontal bar that crosses both characters "t".

The recognition of electronic ink input, such as the word "attaché" depicted in FIGS. 1-4, may involve four general steps: (1) ordering the plurality of strokes that are input by the individual, (1) partitioning the plurality of strokes into a plurality of discrete segments, (3) ordering the segments, and (4) analyzing the segments to determine which characters are associated with the segments. One purpose of partitioning the strokes into discrete segments is to provide defined, individual portions of the strokes to analyze. Each segment may encompass an individual character or portions of a character. Through an analysis relating to the characteristics of the individual segments and the characteristics of adjacent segments, a computing device may determine which characters are associated with the strokes.

One technique for recognizing input involves ordering the strokes and segments in a temporal manner. Accordingly, if a first stroke was formed prior to a second stroke, the first stroke is ordered prior to the second stroke, and the various segments of the first stroke in turn are ordered prior to segments of the second stroke. With reference to the strokes forming the word "attaché" shown in FIGS. 1-4, this technique would order stroke 11 first, stroke 21 second, stroke 31 third, and stroke 41 fourth. Following partitioning of strokes 11, 21, 31, and 41, this order would be retained for the segments in the strokes. Upon analysis of the various segments formed by strokes 11, 21, 31, and 41, the horizontal bars and accent thus would be separated from their related characters.

Various examples of the invention, however, order the strokes and then segments of strokes in a spatial manner. Accordingly, the formation of a first stroke earlier than a second stroke does not necessarily cause the first stroke to be ordered prior to the second stroke. Rather, the spatial relationship between the first stroke and the second stroke will determine the resulting order. Following partitioning, segments from the second stroke may be ordered between segments from the first stroke to retain the general spatial relationship between the first and second stroke. With reference to the strokes forming the word "attaché" shown in FIGS. 1-4, for example, the method of the present invention may, for example, order segments from strokes 21, 31, and 41 between the various segments of stroke 11, thereby placing the horizontal bars adjacent to the portions of stroke 11 that form the two characters "t". Similarly, the inflection for the character "é" may be ordered so as to be adjacent to the portion of stroke 11 that forms the character "é". Accordingly, ordering based upon the spatial relationships of the various strokes provides a more accurate ordering of the various strokes, particularly late strokes.

Once the strokes and their segments have been ordered, the segments of a stroke are analyzed to recognize the characters that they represent. For example, with some recognition techniques, various characteristics of each segment of a stroke are compared with the characteristics of each possible character, in order to determine to which character the segment most closely corresponds. Various characters, such as the character "h," are often represented by multiple segments of a stroke, however. Accordingly, with this technique, the analysis of a segment also will typically include an analysis of the characteristics of adjacent segments. This technique may be performed, for example, using a neural network or similar analysis tool.

While late strokes should be properly associated with previously-formed related strokes in order to accurately display the text after it has been recognized, reordering of the late strokes may reduce the accuracy of the recognition process itself. More particularly, when a segment is analyzed, considering the characteristics of an adjacent segment that is part of a late stroke may cause the analyzed segment to be improperly recognized. For example, when the word "it's" is handwritten in electronic ink, the formation of the handwritten letter "s" will depend upon the characteristics of the handwritten letter "t" immediately written before the letter "s." Accordingly, the process of recognizing a segment forming the handwritten letter "s" would typically include an analysis of one or more characteristics of a segment forming the handwritten letter "t".

When the strokes are reordered based upon their spatial relationships, however, a late stroke representing the apostrophe character will be ordered between the portion of the primary stroke forming the letter "t" and the portion of the primary stroke forming the letter "s." Thus, when a segment of the primary stroke forming the handwritten letter "s" is recognized, the analysis process will consider characteristics of the late stroke forming the apostrophe character rather than the characteristics of a segment of the primary stroke forming the handwritten letter "t".

To address this discrepancy, various examples of the invention will determine the analysis of segments of electronic ink based upon their original, temporal ordering. More particularly, as will be discussed in detail below, various examples of the invention may prevent the characteristics of an adjacent segment from considered in the analysis of a segment if the adjacent segment is part of a late stroke.

Exemplary Operating Environment

The method of analyzing and ordering late strokes and disordered strokes of the invention may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Figure 5:
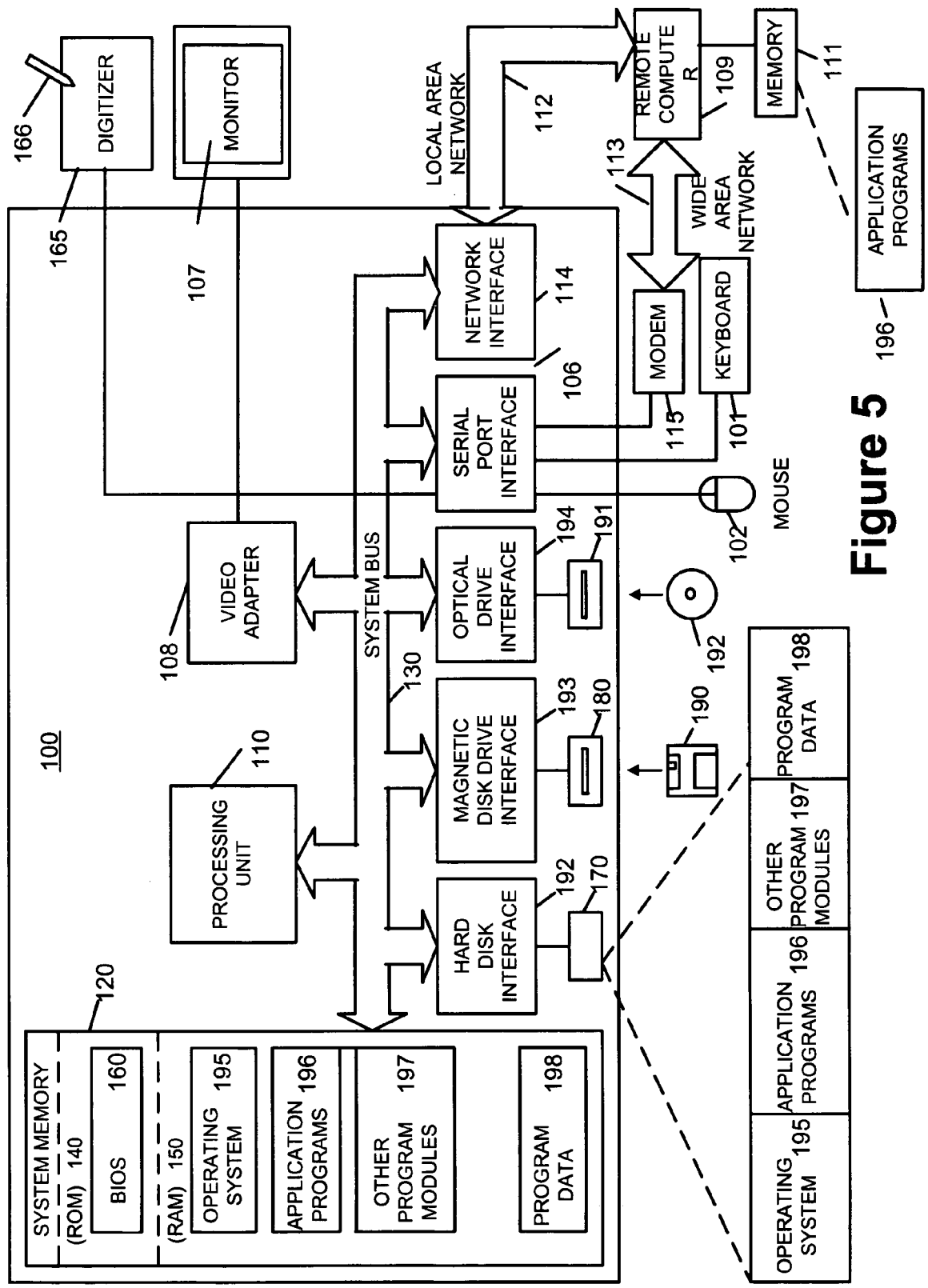
FIGS. 5-7 illustrate an exemplary operating environment in which various examples of the invention may be implemented.

As noted above, the invention relates to electronic ink objects that may be displayed by a computing device. Accordingly, it may be helpful for a better understanding of the invention to briefly discuss the components and operation of a typical programmable computer system on which various embodiments of the invention may be implemented. FIG. 5 is a functional block diagram of an example of a conventional general-purpose digital computing environment that can be used to implement various aspects of the present invention. A computing device 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computing device 100, such as during start-up, is stored in the ROM 140. The computing device 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computing device 100. It will be appreciated by those skilled in the art that other types of computer readable media that can store data that is accessible by a computing device, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. An individual can enter commands and information into the computing device 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a suitable embodiment, a pen digitizer 165 and accompanying pen or stylus 166 are provided in order to digitally capture free-form input, such as ink. Although a direct connection between the pen digitizer 165 and the serial port is shown, in practice, the pen digitizer 165 may be coupled to the processing unit 110 directly, via a parallel port or other interface and the system bus 130 as known in the art. Furthermore, although the digitizer 165 is shown apart from the monitor 107, in many embodiments of the invention the usable input area of the digitizer 165 is co-extensive with the display area of the monitor 107. Further still, the digitizer 165 may be integrated into the monitor 107, or may exist as a separate device overlaying or otherwise appended to the monitor 107.

Application programs 196 and program modules 197 may include a parsing module and a recognition module for use in receiving and analyzing ink input via the stylus 166. The parsing module may be used to analyze received strokes and group the strokes into ink objects (e.g., characters, words, drawings, etc.). The recognition module may be used to analyze ink objects and perform character recognition on ink objects corresponding to alphanumeric handwritten entry. The recognition information may then be stored as a property of the ink object. Examples of such parsing and recognition modules are available from Microsoft Corporation of Redmond, Wash. in the Tablet PC Platform Software Development Kit (SDK).

The computing device 100 can operate in a networked environment using logical connections to one or more remote computing devices, such as a remote computer 109. The remote computer 109 can be a server, a router, a network PC, a peer device or other common network node, and typically includes many or all of the elements described above relative to the computing device 100, although only a memory storage device 111 has been illustrated in FIG. 5. The logical connections depicted in FIG. 5 include a local area network (LAN) 112 and a wide area network (WAN) 113. Such networking environments are commonplace in offices, enterprise-wide computer networks, intranets and the Internet and use both wired and wireless communication protocols.

When used in a LAN networking environment, the computing device 100 is connected to the local network 112 through a network interface or adapter 114. When used in a WAN networking environment, the personal computing device 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computing device 100, or portions thereof, may be stored in the remote memory storage device.

It will be appreciated that the network connections shown are illustrative and other techniques for establishing a communications link between the computing devices can be used. The existence of any of various well-known protocols such as TCP/IP, Ethernet, FTP, HTTP and the like is presumed, and the system can be operated in a client-server configuration to permit an individual to retrieve web pages from a web-based server. Any of various conventional web browsers can be used to display and manipulate data on web pages.

As previously noted, one or more aspects of the invention may be embodied in computer-executable instructions, such as in one or more program modules, executed by one or more computers or other devices. Generally, these program modules may include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), and the like.

Figure 6:
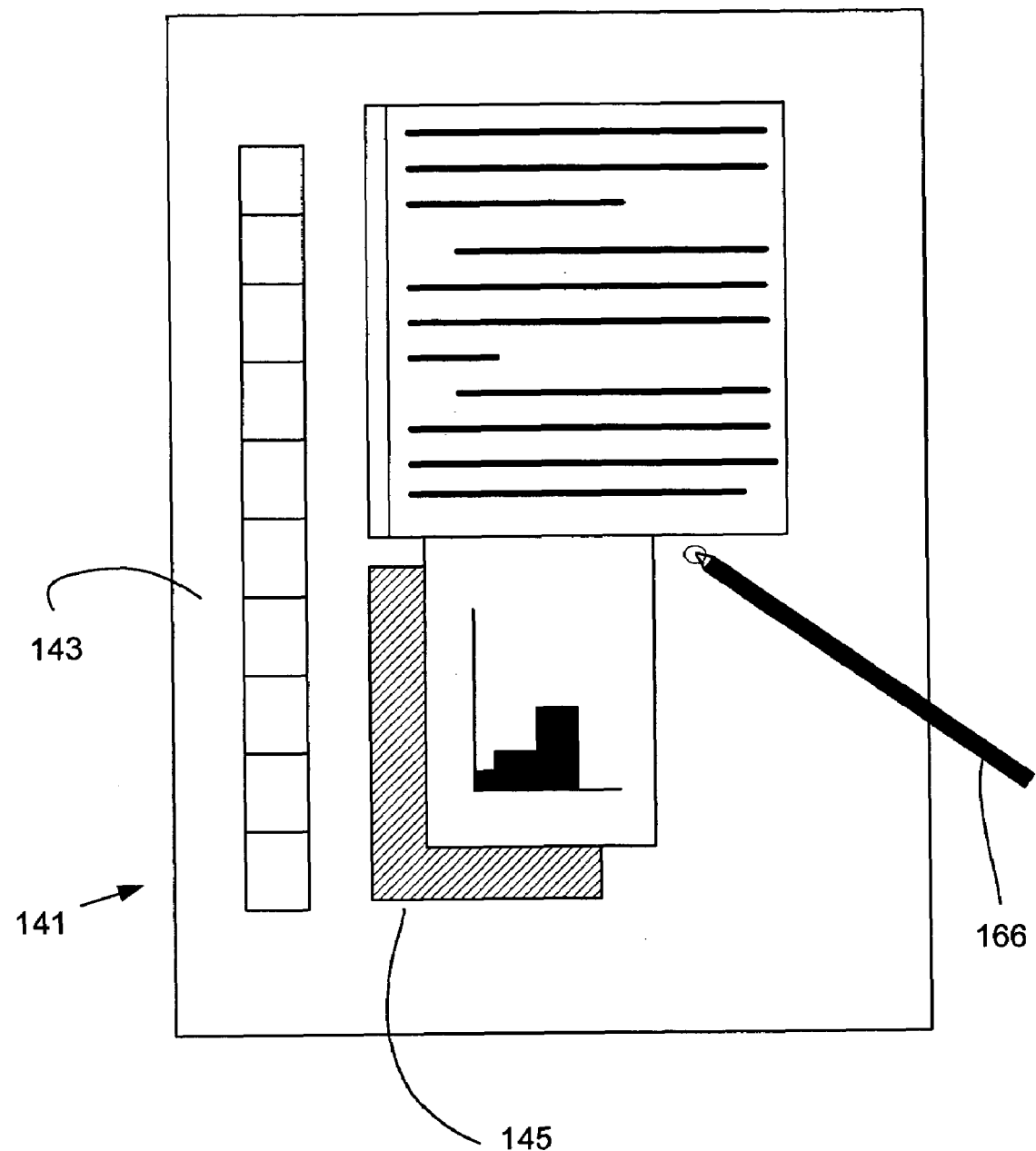

FIG. 6 illustrates a pen-based personal computer 141 that can be used in accordance with various aspects of the present invention. Any or all of the features, subsystems, and functions in the system of FIG. 5 can be included in the computer of FIG. 6. The pen-based personal computer system 141 includes a large display surface 143, e.g., a digitizing flat panel display, such as a liquid crystal display (LCD) screen, on which a plurality of graphical user interfaces 145, such as windowed graphical user interfaces, is displayed. Display surface 143 may also incorporate digitizer 165. Using stylus 166, an individual can select, highlight, and write on the digitizing display area. Examples of suitable digitizing display panels include electromagnetic pen digitizers, such as pen digitizers available from Mutoh Co. (now known as FinePoint Innovations Co.) or Wacom Technology Co. Other types of pen digitizers, e.g., optical digitizers, and touch-sensitive digitizers may also be used. The pen-based computing system 141 interprets gestures made using stylus 166 in order to manipulate data, enter text, and execute conventional computer application tasks, such as creating, editing, and modifying spreadsheets, word processing programs, and the like.

The stylus 166 may be equipped with buttons or other features to augment its capabilities. In one example, a stylus 166 could be implemented as a "pencil" or "pen", in which one end constitutes a writing portion. The other end of the stylus 166 then constitutes an "eraser" end, which, when moved across the display, indicates portions of electronic ink on the display that are to be erased. Other types of input devices, such as a mouse, trackball, keyboard, or the like also could be used. Additionally, an individual's own finger could be used for selecting or indicating portions of the displayed image if the display is a touch-sensitive or proximity-sensitive display. Consequently, the term "user input device," as used herein, is intended to have a broad definition and encompasses many variations on well-known input devices.

In various examples, the system provides an ink platform as a set of COM (component object model) services that an application program can use to capture, manipulate, and store ink. The ink platform also may support a mark-up language including a language like the extensible markup language (XML). Further, the system may use DCOM as another implementation. Yet further implementations may be used including the Win32 programming model and the .Net programming model from Microsoft Corporation. These platforms are commercially available and known in the art.

In addition to use with full performance pen-based computing systems or "tablet PCs" (e.g., convertible laptops or "slate" type tablet PCs), aspects of this invention can be used in conjunction with other types of pen-based computing systems and/or other devices that accept data as electronic ink and/or accept electronic pen or stylus input, such as: hand-held or palm-top computing systems; personal digital assistants; pocket personal computers; mobile and cellular telephones, pagers, and other communication devices;

watches; appliances; and any other devices or systems that include a monitor or other display device and/or a digitizer that presents printed or graphical information to individuals and/or allows input using an electronic pen or stylus, or which can process electronic ink collected by another device (e.g., a conventional desktop computer that can process electronic ink collected by a tablet PC).

Operating Environment for Electronic Ink Input Analysis

Figure 7:
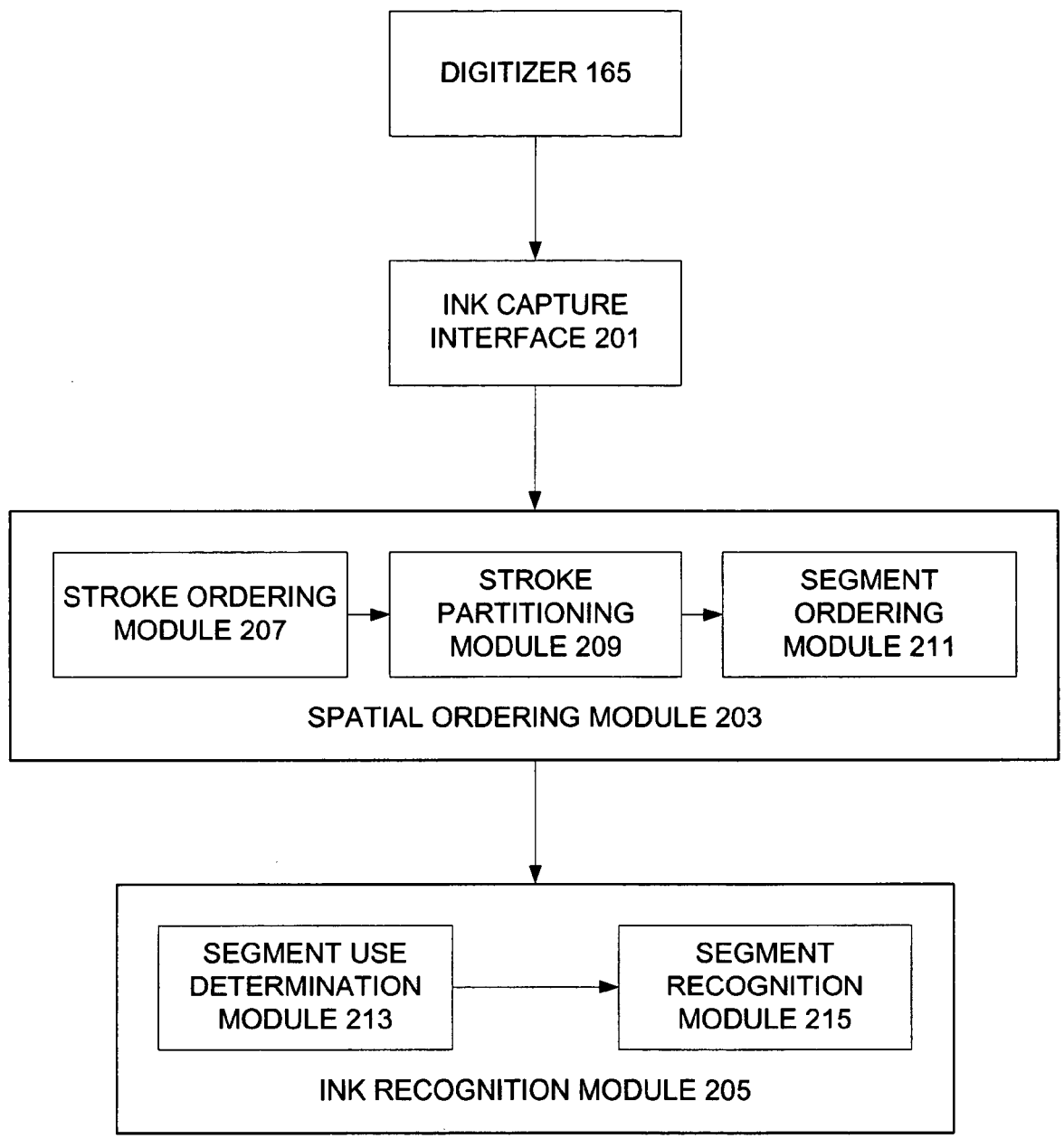

In addition to the various elements described above, computing device 100 or pen-based personal computer 141 may provide an ink capture interface 201, and a spatial ordering module 203 and an ink recognition module 205 according to various examples of the invention, as shown in FIG. 7. Ink capture interface 201 digitally captures free-form data input generated when stylus 166 contacts digitizer 165. The input is then transmitted to spatial ordering module 203. The spatial ordering module orders the received strokes, partitions the received strokes into segments, and then orders the segments. More particularly, spatial ordering module 203 orders the strokes and the segments based upon spatial relationships, rather than temporal relationships, as discussed above. Data relating to the ordered segments is then transmitted to ink recognition module 205 for analysis, to determine which characters are associated with the segments.

Spatial ordering module 203 includes a stroke ordering module 207, a stroke partitioning module 209, and a segment ordering module 211. Stroke ordering module 207 orders the plurality of strokes that are captured or otherwise detected by ink capture interface 201 based upon their spatial relationships. Data concerning the ordered strokes is then transmitted to stroke partitioning module 209, which partitions the strokes into a plurality of discrete segments. It should be appreciated, however, that stroke partitioning alternately may occur prior to stroke ordering. Following partitioning, data concerning the partitioned strokes is transmitted to segment ordering module 211, which orders the segments based upon their spatial relationships.

Ink recognition module 205 includes a segment use determination module 213 and a segment recognition module 215. Segment use determination module 213 ascertains whether characteristics of particular segments will be employed by the segment recognition module 215 to analyze other segments. As will be discussed in greater detail below, using characteristics of segments from late strokes to analyze segments from primary strokes may affect the accuracy of the recognition of the characters in the primary strokes, and vice versa. Accordingly, segment use determination module 213 selects which adjacent segments will be employed in the analysis of a segment. The segment recognition module 215 then analyzes the selected segments to determine which characters are represented by the segments.

As will be appreciated by those of ordinary skill in the art, the ink recognition module 205 may be implemented using a neural network. Conventionally, a neural network is an interconnected system of processing elements, each with a limited number of inputs and an output. The processing elements are able to "learn" by operating on input values with weighted values that, with adjustment, time, and repetition, can be made to produce appropriate output values. Neural networks are conventionally used in areas such as pattern recognition, speech analysis, and speech synthesis. Neural networks may also be used, as with ink recognition module 205, to recognize handwriting. That is, a neural network may be utilized to recognize characters represented by electronic ink. One skilled in the relevant art will recognize, however, that a plurality of other recognition systems may also be utilized within the scope of the present invention to recognize characters represented by electronic ink.

Recognition of Electronic Ink Containing Late Strokes

Figure 8:
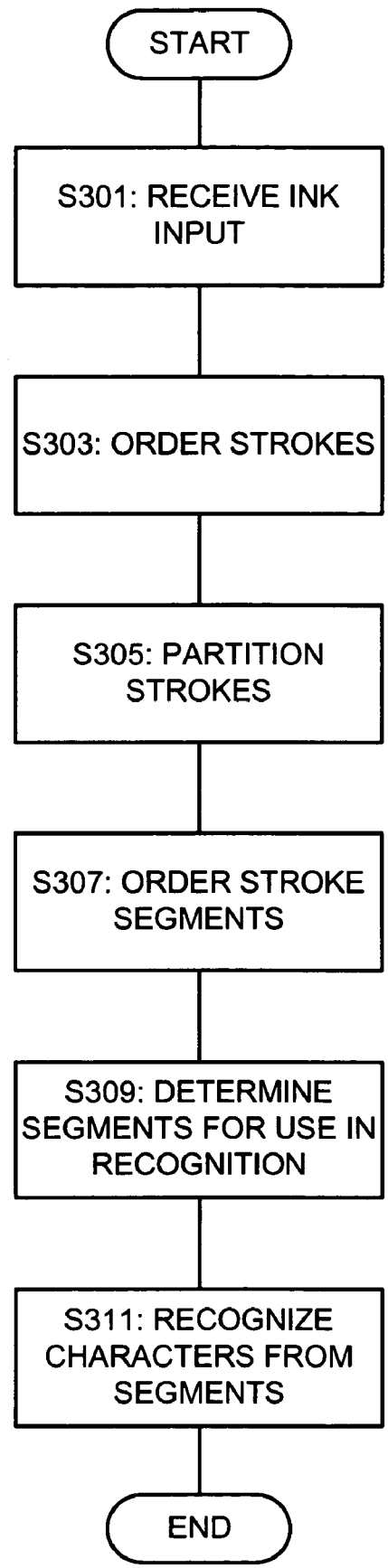
FIG. 8 is a flow diagram illustrating the general analysis of free-form data input.

With reference to FIG. 8, an initial step in the recognition of electronic ink data input relates to the receipt of ink input (Step 301). As discussed above, ink capture interface 201 digitally captures electronic ink generated when stylus 166 contacts digitizer 165. Such interfaces are well-known, and thus will not be discussed in further detail here. Following the receipt of ink input, the various strokes are resampled to produce equidistant consecutive points, and the various strokes are ordered (Step 303). As discussed above, ordering of the strokes is based upon the spatial relationships between the strokes, rather than the temporal relationship between the strokes.

The strokes received as ink input also are partitioned into segments (Step 305). The various segments of each stroke may contain an individual character, a portion of a character, or even portions of two or more characters. Following partitioning, the stroke segments are ordered (Step 307). As with the ordering of the strokes, ordering of the segments is based upon the spatial relationships between the segments, rather than the temporal relationship between the segments. Steps 303-307 may be performed by spatial ordering module 203 or, more specifically, stroke ordering module 207, stroke partitioning module 209, and segment ordering module 211.

After the segments have been ordered, a determination is made as to how the segments will be utilized in the recognition analysis of the electronic ink (Step 309). Analyzing segments from primary strokes using characteristics of segments from late strokes may affect recognition of the characters in the primary strokes, as previously noted. Accordingly, a component, such as segment use determination module 213, determines whether the analysis of a segment will employ characteristics from specific adjacent segments. Characters are then recognized from the segments (Step 311). More particularly, a component, such as segment recognition module 215, may be utilized to analyze the characteristics of the various segments, to determine which characters are represented by the segments.

Stroke Ordering

A Cartesian coordinate system 51 is depicted in FIG. 4 that includes an x-axis and an orthogonal y-axis. In accordance with the conventions of Western languages, individuals generally write along horizontal lines in a "left to right" direction (i.e., as the terms "left" and "right" are used herein, in the direction of increasing values of the x-axis in FIG. 4). Once writing extends entirely across a first horizontal line, individuals will continue writing along a second horizontal line in a "left to right" direction. The second horizontal line is generally located below the first horizontal line (i.e., in the direction of a decreasing value of the y-axis in FIG. 4).

The spatial relationship of the various strokes may be determined with reference to the x-coordinate and y-coordinate values of the points along the strokes. With the exception of a stroke that is merely a point, strokes thus will have a first x-coordinate value that corresponds with the beginning of the stroke (i.e., the first point of the stroke) and a second x-coordinate value that corresponds with an end of the stroke (i.e., the end of the stroke). When determining the spatial relationships of the various strokes, the x-coordinate values of the first and last points of the strokes may be compared.

Figure 9A:
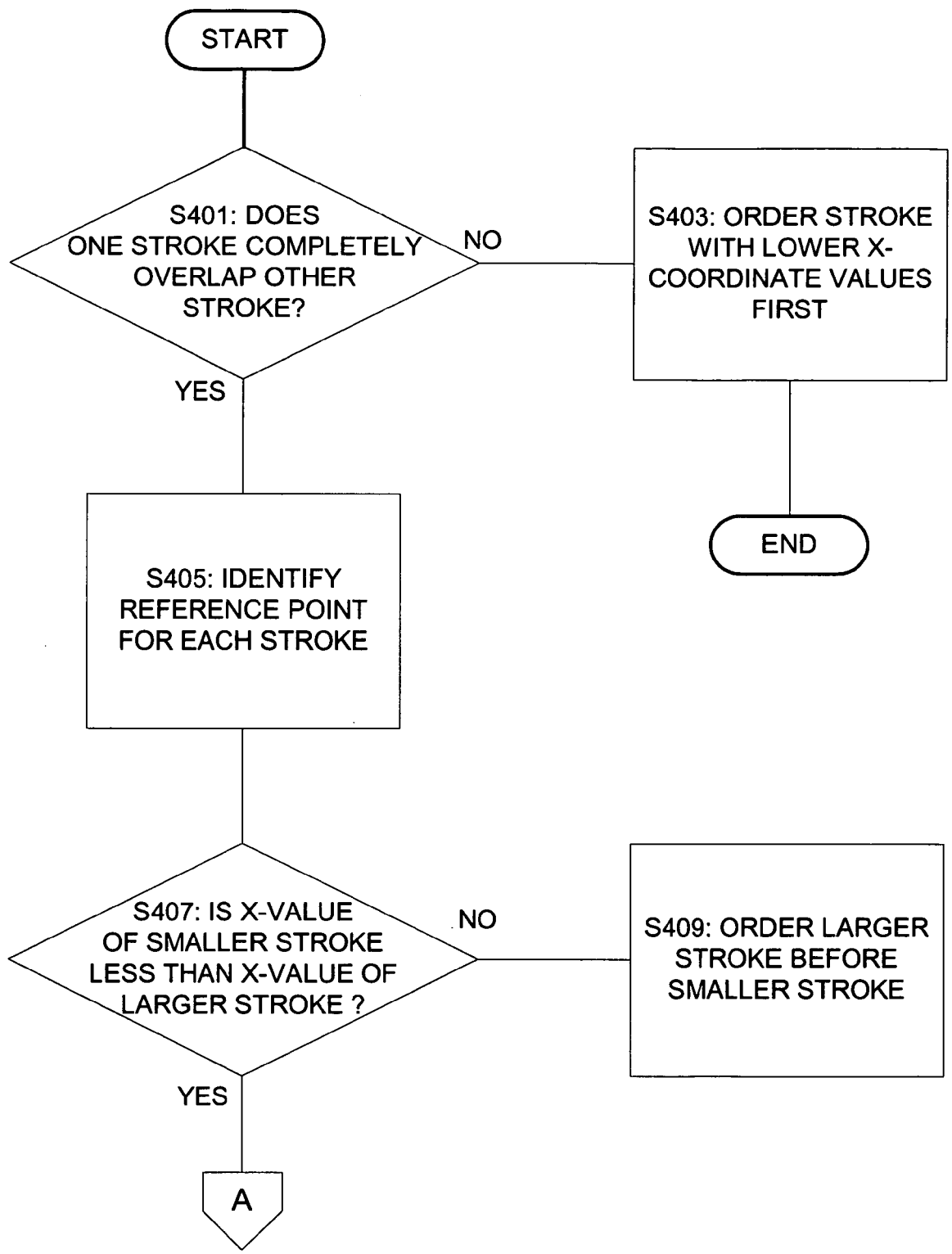
FIGS. 9A and 9B are a flow diagram that illustrates a method of ordering strokes.
Figure 9B:
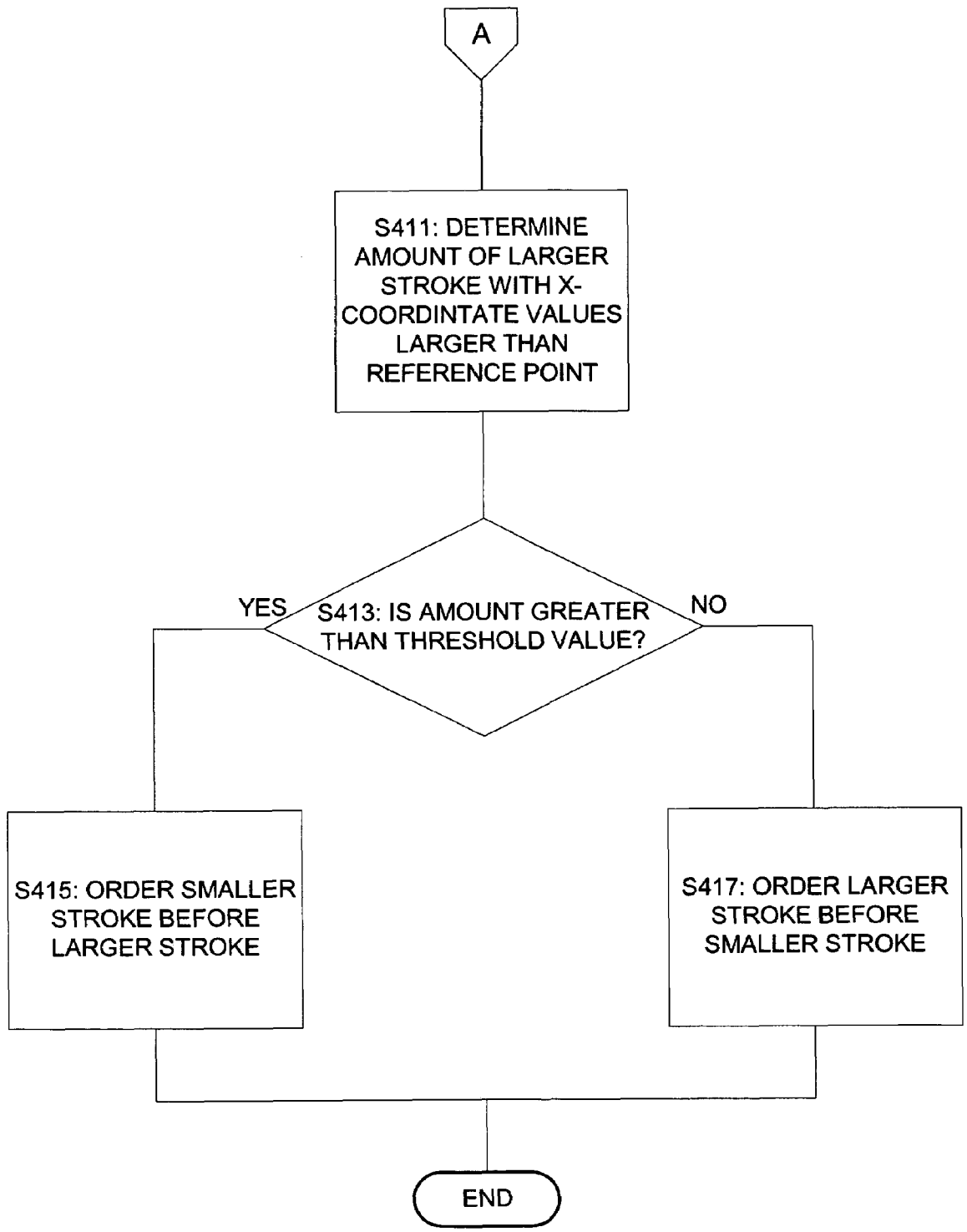

With reference to FIGS. 9A and 9B, one method by which strokes may be ordered according to various embodiments of the invention will now be discussed in greater detail. An initial determination is made as to whether one stroke completely overlaps another stroke (Step 401). A determination regarding the overlapping of strokes may be performed by comparing the highest x-coordinate value and the lowest x-coordinate value of each of the two strokes. For example, if the highest and lowest x-coordinate values a first stroke are both lower than the lowest x-coordinate value of a second stroke, then the strokes do not overlap and are spatially-separate from each other. If, however, either the highest x-coordinate value or the lowest x-coordinate value of the first stroke falls between the highest and lowest x-coordinate values of the second stroke, then the strokes at least partially overlap. In addition, if both the highest and lowest x-coordinate values of the second stroke fall between the highest and lowest x-coordinate values of the first stroke, then the first stroke completely overlaps the second stroke.

Referring to Step 401, if a first stroke does not completely overlap a second stroke (i.e., the strokes are spatially-separate or only partially overlap), then the stroke with the lowest x-coordinate value is ordered before the other stroke (Step 403). Accordingly, spatially-separate or partially-overlapping strokes are ordered such that the left-most stroke is before the right-most stroke.

If a first stroke completely overlaps a second stroke (as defined above), then the first stroke is probably larger (in the direction of the x-axis) than the second stroke, and this distinction may be used to order the strokes relative to each other. More particularly, if a first stroke overlaps a second stroke, then a reference point for each stroke is identified (Step 405). The reference points for the strokes may be any analogous point common to both strokes. For example, with various examples of the invention, the reference point for both strokes will be the first "top point" for each stroke. As used herein, the term "top point" refers to a point on a stroke with a y-coordinate value higher than the y-coordinate value of the immediately adjacent points on either side. (That is, a point where the stroke stops heading in an upward direction and begins heading in a downward direction.) Thus, the first "top point" of a stroke is the top point having the lowest x-coordinate value.

Following the identification of a reference point for each stroke, a determination is then made as to whether the x-coordinate value of the reference point of the second stroke (i.e., the smaller stroke) is less than the x-coordinate value of the reference point of the first stroke (i.e., the larger stroke) (Step 407). If not, then the first stroke (i.e., the larger stroke) is ordered before the second stroke (i.e., the smaller stroke). If, however, the x-coordinate value of the reference point of the second stroke (i.e., the smaller stroke) is less than the x-coordinate value of the reference point of the first stroke (i.e., the larger stroke), then a determination is made as to the amount of the first stroke that falls within a threshold range. (Step 411).

With some embodiments of the invention, the threshold range will include all of the points on the first stroke with x-coordinate values that are greater than the x-coordinate value of the reference point of the first stroke (i.e., the larger stroke), and all of the points on the first stroke that have both a higher x-coordinate value and a lower y-coordinate value than the left top corner of a bounding box for the second stroke (i.e., the smaller stroke). If the total amount of points of the first stroke within this threshold range exceeds a threshold amount (Step 413), then the smaller stroke is ordered before the larger stroke (Step 415). If, however, the amount is less than a threshold amount (Step 413), then the larger stroke is ordered before the smaller stroke (Step 417).

The threshold amount may be selected to be a suitable value for providing consistent results. For example, with various embodiments of the invention, the threshold amount may be 25% of the total number of points in the first stroke. That is, if more than 25% of the points of the first stroke fall are to the left of the reference point of the first stroke or are to the left of and below the upper left corner of a bounding box for the second stroke, then the first, larger stroke will be ordered after the second, smaller stroke. Of course, still other embodiments of the invention may employ different threshold ranges or other criteria for determining the ordering of overlapping strokes.

The above analysis relates generally to a comparison of various x-coordinate values to determine ordering of the strokes. Some embodiments of the present invention may also incorporate comparisons of y-values. For example, the procedure of Step 411 may also include a determination relating to the amount of the larger stroke with y-values that are less than a reference y-value of the smaller stroke. Furthermore, some Eastern languages are written along vertical lines, rather than horizontal lines. Accordingly, the above analysis may be modified to generally compare various y-values to determine ordering of the strokes.

Stroke Partitioning

Either prior to ordering of the strokes or following ordering of the strokes, the various strokes are partitioned (Step 305). The manner in which a stroke is partitioned may vary, and the number of segments formed from a stroke will vary depending upon the length and complexity of the stroke, and other characteristics that are unique to the stroke. Partitioning of the strokes identifies a start point and an end point for each segment of a stroke. Further, partitioning of a stroke identifies a reference point for each segment.

One technique for partitioning strokes according to various embodiments of the invention identifies "bottom points" along the stroke, and then partitions the stroke into segments between these "bottom points." As discussed above, a "top point" is a point on a stroke with a y-coordinate value higher than the y-coordinate value of the immediately adjacent points on either side. Similarly, a "bottom point" is a point on a stroke with a y-coordinate value lower than the y-coordinate value of the immediately adjacent points on either side. Thus, the start point and end point of a segment will be adjacent bottom points. The reference point for each stroke may then be the top point of the segment written between two adjacent bottom points.

It should be noted that a reference point may not actually be spatially located between the start and end points of a segment. For example, when writing the stroke, a user may create the stroke with a slant so that, between the start point and the end point of the segment, the stroke extends over the start point or the end point. More particularly, if the stroke slants back to the left (i.e., in the direction of decreasing x-coordinate values), then the reference point may extend back over the start point of the segment. On the other hand, if the stroke slants forward to the right (i.e., in the direction of increasing x-coordinate values), then the reference point may extend forward over the end point of the segment.

It also that be appreciated that, while the discussion of various embodiments of the invention herein relate to the use of bottom points to define segments and top points as reference points, alternate embodiments of the invention may define segments using other criteria. For example, the start and end points of the segments alternately may be adjacent top points of the stroke. With some languages, such as French, various embodiments of the invention may obtain more accurate ordering of the segments by partitioning the stroke at mid-points on the stroke between adjacent top and bottom points. Similarly, reference points for the segments may be mid-points on the stroke between adjacent top and bottom point or the bottom points of the segment. Accordingly, the manner of partitioning strokes may vary as desired within the scope of the present invention.

Figure 10:
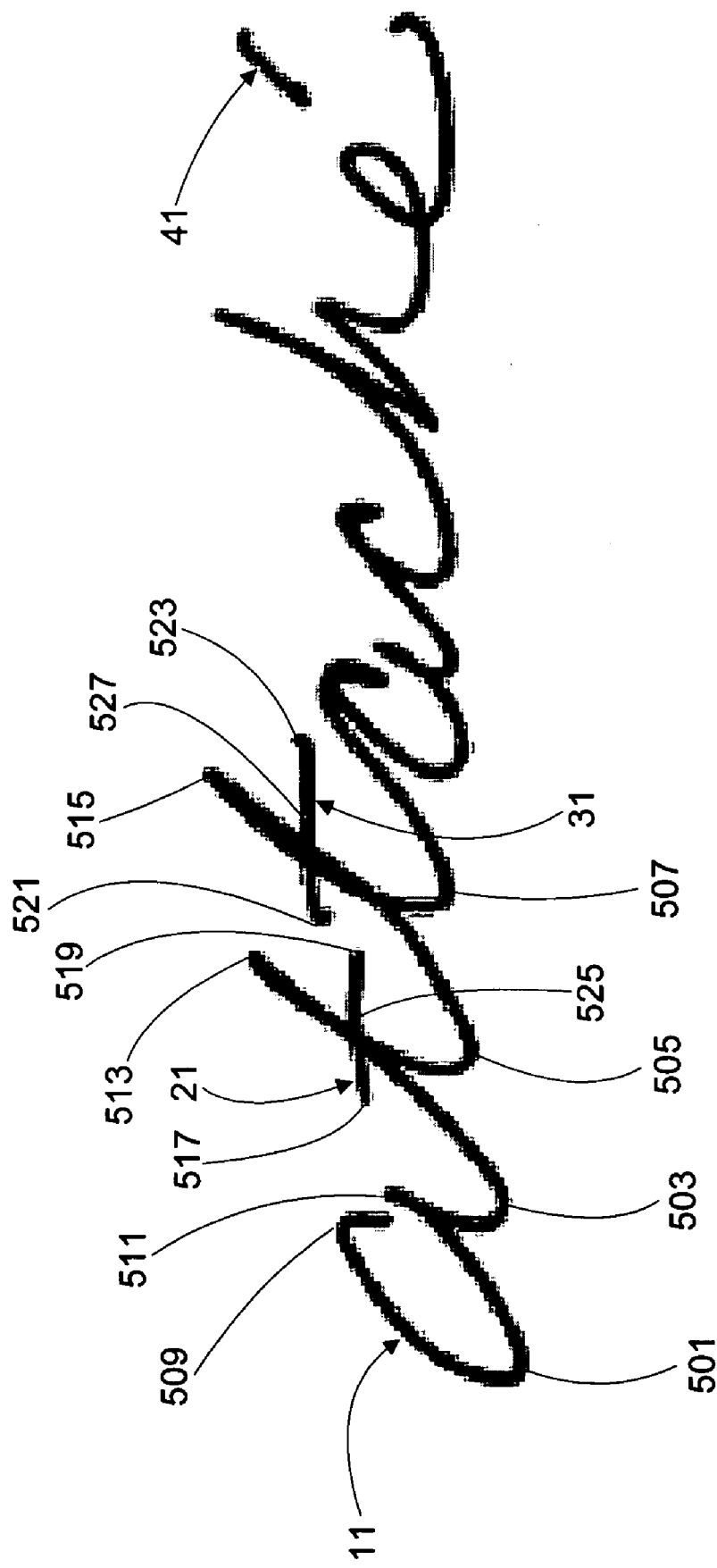
FIG. 10 depicts electronic ink formed from a plurality of strokes.

With reference to FIG. 10, the method by which strokes are partitioned will be discussed in greater detail. Referring to a first portion of stroke 11, four bottom points 501, 503, 505, and 507 are defined. (While stroke 11 also includes a plurality of additional bottom points, these will not be discussed herein for simplicity and ease of understanding). Bottom points 501-507 define the start and end points of four segments that include reference points 509, 511, 513, and 515. More particularly, the portion of the stroke between the first point in the stroke and the bottom point 501 is a segment with the reference point 509. The portion of the stroke between the bottom point 501 and the bottom point 503 is another segment with the reference point 511. The portion of the stroke between the bottom point 503 and the bottom point 505 is yet another segment with the reference point 513, and the portion of the stroke between the bottom point 505 and the bottom point 507 is another segment with the reference point 515.

As previously noted, with the illustrated embodiment segments are defined between two adjacent bottom points with a single top point written between the bottom points serving as the reference point for the segment. If, however, a stroke is a straight line without two bottom points, then the start point and end point of the segment are the start point and end point of the stroke, respectively. This type of stroke is often formed, for example, to create the "-" shape for crossing the character "t" or the "/" shape for writing the character "x." If the segment is a straight line, then the reference point for the segment may be, for example, the mid-point between the start point and the end point of the segment. Referring to FIG. 10, stroke 21 is a straight line that includes a start point and an end point 517 and 519, respectively, which form the ends of a segment having the reference point 525. Similarly, stroke 31 includes a start point and an end point 521 and 523, respectively, which form the ends of a segment having the reference point 527. A stroke may also consist of a single point, such as when a writer is dotting the character "i". With this type of stroke, the point itself is the segment and the reference point.

Segment Ordering

Following partitioning of various strokes into segments, the stroke segments then are ordered (Step 307). As with ordering of the strokes, ordering of the segments is based upon the spatial relationships between the segments, rather than upon the temporal relationship between the segments. At this stage of the process, ordering of the strokes has provided a defined order for the strokes and each stroke is partitioned. Accordingly, the segments of a first stroke precede all of the segments of a second stroke, and the segments of the first and second stroke precede all of the segments of a third stroke. Ordering of the segments may, for example, maintain the order of the individual segments created by the ordering of the strokes. Alternately, however, ordering of the segments may place the segments of a late stroke between segments of an earlier stroke.

For example, the word "attaché", as depicted in FIG. 10, is formed of four strokes 11, 21, 31, and 41. Utilizing the process of ordering strokes discussed above, strokes 11, 21, 31, and 41 would be ordered such that stroke 11 precedes stroke 21. As is apparent from an examination of FIG. 10, however, stroke 21 is a horizontal bar that corresponds with the first character "t". The proper ordering for stroke 21 is, therefore, adjacent to the portions of stroke 11 that form the vertical bar of the character "t". Proper ordering of the segments that form strokes 11 and 21 will, therefore, place the segment of stroke 21 adjacent to the segment of stroke 11 that forms the vertical bar of the character "t".

Figure 11A:
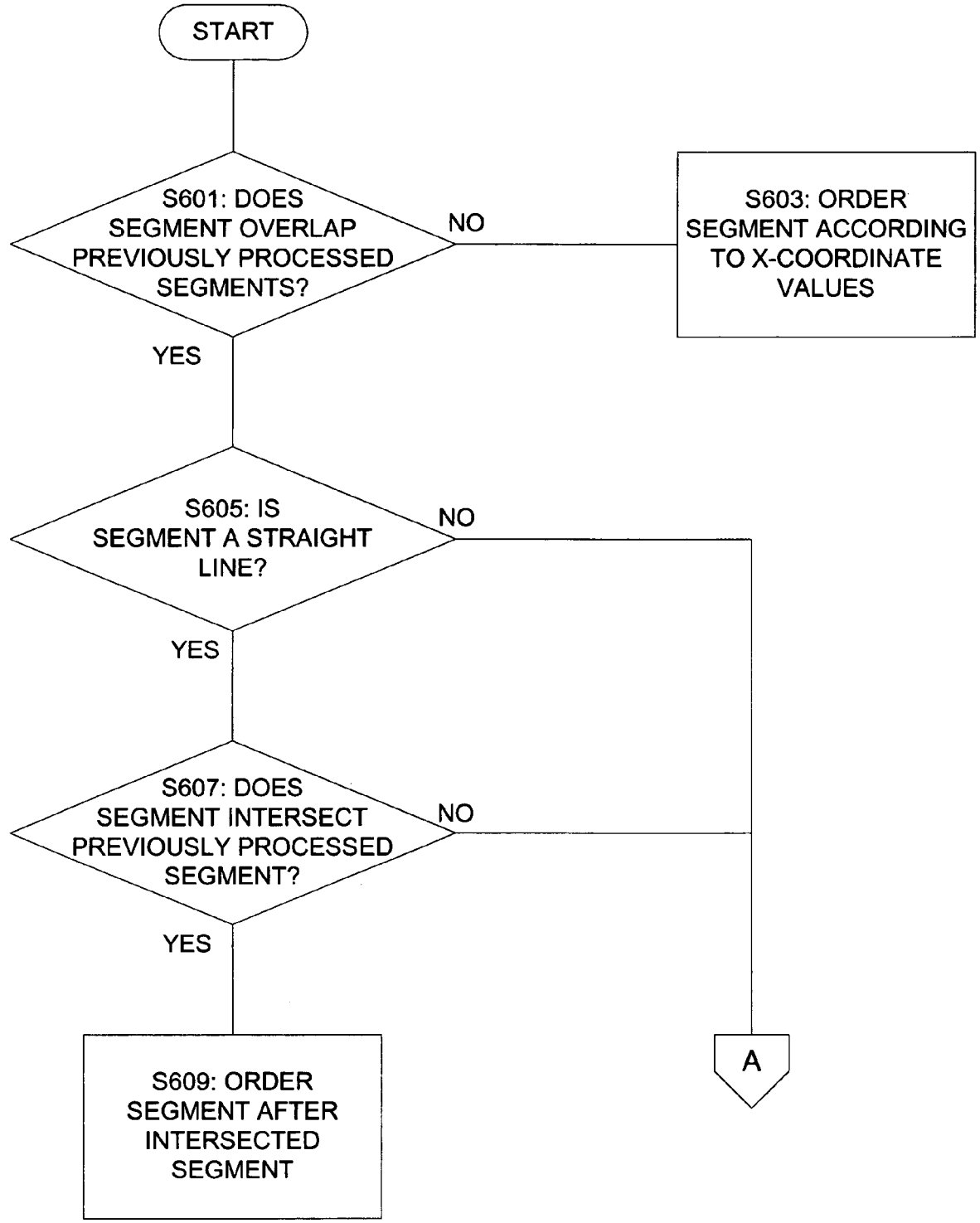
FIGS. 11A and 11B are a flow diagram that illustrates a method of ordering stroke segments.
Figure 11B:
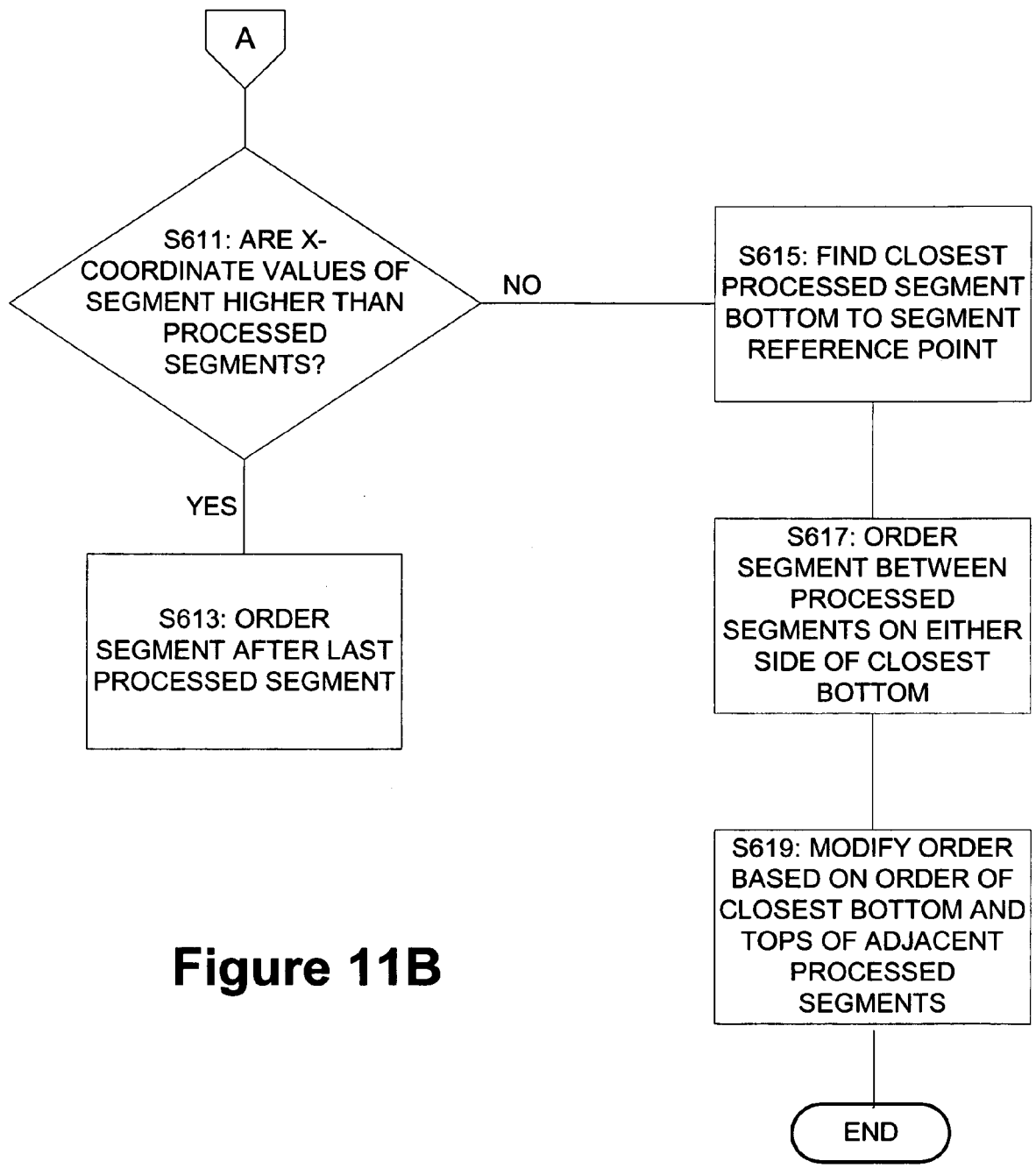

FIGS. 11A and 11B provide a flow diagram that outlines the process of partitioning strokes. The ordering of strokes discussed above may be used to determine the sequence in which the strokes, or the segments of the strokes, are processed. First, a determination is made as to whether the segment being processed overlaps a previously processed segment (Step 601). More particularly, the initial determination is whether the x-coordinate values of a segment of the second stroke overlaps the x-coordinate values a segment of the first stroke. As explained above with reference to the process for ordering the strokes, overlap of two segments can be identified by determining if either the highest x-coordinate value or the lowest x-coordinate value of the segment being processed falls between the highest x-coordinate value and the lowest x-coordinate value among the segments that have already been processed.

If there is no x-coordinate value overlap, then the segment being processed is ordered relative to the previously processed segments according to their x-coordinate values (Step 603). This portion of the method accounts for segments of words, for example, that are spatially-separated from each other. Accordingly, all of the segments forming a first word will precede all of the segments forming a separate, subsequently-written second word to the right of the first word.

When a segment being processed does overlap a previously processed segment, a determination is made as to whether the segment being processed is a straight line (Step 605). If the segment being processed is a straight line, then a check is made to determine if that segment intersects a previously processed segment. If the segment being processed intersects a previously processed segment (Step 607), then the segment is ordered after the previously-processed segment that is intersects (Step 609). In general, this portion of the method accounts for relatively common characters that include strokes forming a straight line, such as the characters "t", "T", "f", "F", "x", "X", "H", and "E", for example.

Referring to FIG. 10, the one segment of stroke 21 overlaps the segment of stroke 11 having reference point 513. In addition, stroke 21 is a straight line and overlaps a segment that typically would be previously processed (i.e., the segments of stroke 11 typically would be processed before the segment of stroke 21). Accordingly, the segment forming stroke 21 is ordered to follow the segment of stroke 11 having reference point 513. That is, the segment forming stroke 21 is ordered so as to be between the segment having reference point 513 and the segment having reference point 515. An advantage of this method of ordering is that stroke 21 is located adjacent to a corresponding portion of stroke 11. If stroke 21 were ordered according to a temporal system, then stroke 21 would most likely follow all of the segments of stroke 11 and portions of the character "t" would be separated from each other.

If the segment being processed overlaps a previously processed segment but is not straight or is straight but does not intersect a previously processed segment, then a determination is made as to whether the x-coordinate values of the segment being processed generally are greater than previously processed segments. That is, a determination is made as to whether the segment being processed is a continuation of the writing of the previously-processed segments that, for example, simply slants back to overlap one or more of the previously processed segment.

This determination can be made using any desirable test. For example, with some embodiments of the invention, the x-coordinate value of the reference point for the segment being processed can be compared with the lowest x-coordinate value among the previously-processed segments. If the x-coordinate value of the reference point for the segment being processed is lower than the lowest x-coordinate value among the previously-processed segments, then the highest x-coordinate value of the segment being processed is compared with the highest x-coordinate value among the previously-processed segments. If the highest x-coordinate value of the segment being processed is greater than the highest x-coordinate value among the previously-processed segments, then the segment being processed may be considered to have x-coordinate values that are generally higher than those of the previously-processed segments. In this situation, the segment being processed is ordered to follow the previously-processed segments (Step 613).

If the x-coordinate values of the segment being processed are not greater than previously processed segments, then the segment being processed will be ordered between two previously-processed segments. With some embodiments of the invention, the segment being processed is ordered between the previously-processed segments joined at the bottom point closest to the reference point of the segment being processed. More particularly, the reference point of the segment being processed will fall between two adjacent bottom points. Of these bottom points, the bottom point having an x-coordinate value closest to the x-coordinate value of the reference point for the segment being processed will be selected (Step 615). The segment being processed will then be ordered between the previously-processed segment having this closest bottom point as an end point and the previously-processed segment having this closest bottom point as a start point (Step 617).

With various embodiments of the invention, this ordering may be further modified, however, to improve the accuracy of the segment ordering. For example, with various embodiments of the invention, the slant of the strokes may be taken into account to improve the accuracy of the segment ordering. As previously noted, slanting of the ink can cause the top point of a segment to have a higher x-coordinate value than the end point of the segment, or it can cause the top point of a segment to have a lower x-coordinate value than the start point of the segment. To address this situation, if a segment being processed is ordered at a bottom point "overhung" by the slant of a segment including that bottom point, then the segment being processed can be moved to an adjacent bottom point (i.e., a bottom point that is not the closest to the reference point of the segment being processed) (Step 619).

Thus, if the closest bottom point is the end point of a segment that overhangs that bottom point (i.e., the segment has a top point with a higher x-coordinate value than the x-coordinate value of the bottom point), then the ordering of the segment being processed may be modified. In particular, the bottom point immediately adjacent to the closest bottom point and having a lower x-coordinate value than the closest bottom point (i.e., the bottom point immediately to the "left" of the closest bottom point) is identified. The segment being processed is then ordered between the segment having this alternate bottom point as an end point and the previously-processed segment having this alternate bottom point as a start point.

If, on the other hand, the closest bottom point is the start point of a segment that overhangs that bottom point (i.e., the segment has a top point with a lower x-coordinate value than the x-coordinate value of the bottom point), then the ordering of the segment being processed also may be modified. In particular, the bottom point immediately adjacent to the closest bottom point and having a higher x-coordinate value than the closest bottom point (i.e., the bottom point immediately to the "right" of the closest bottom point) is identified. The segment being processed is then ordered between the segment having this alternate bottom point as an end point and the previously-processed segment having this alternate bottom point as a start point.

Determining Segments for Use in Recognition

As noted above, once the segments of the strokes have been ordered, the segments are analyzed to determine if they correspond to particular characters. More particularly, various characteristics of each segment, such as, e.g., height, width, etc., are analyzed to determine how closely those characteristics match the known characteristics of exemplary characters. In addition to analyzing the characteristics of the segment being recognized, however, the recognition process may also analyze the characteristics of adjacent segments. For example, as previously discussed, when the word "it's" is handwritten in electronic ink, the formation of the handwritten letter "s" will depend upon the characteristics of the handwritten letter "t" immediately written before the letter "s." Accordingly, the process of recognizing a segment forming the handwritten letter "s" would typically include an analysis of one or more characteristics of a segment forming the handwritten letter "t".

Figure 12:
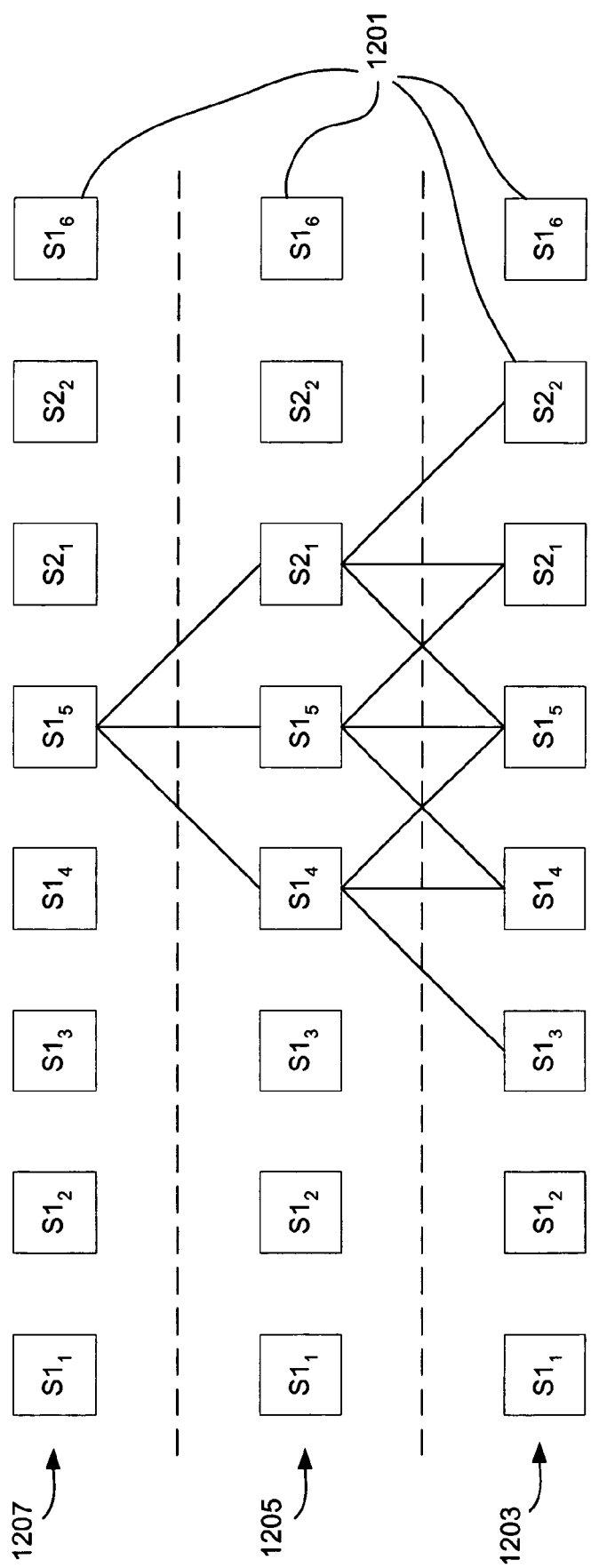
FIGS. 12 and 13 illustrate examples of a neural network arrangement that can be employed to recognize reordered segments according to various examples of the invention.

This type of pattern analysis may be implemented, for example, using a neural network. For example, FIG. 12 illustrates one type of neural network that may be used to analyze segments of handwritten electronic ink. In particular, the network includes a plurality of nodes 1201. The nodes 1201 are arranged into three layers: an input layer 1203, an intermediate layer 1205, and an output layer 1207. Each node represents one or more operations that are performed on segment characteristic values associated with the corresponding segment. For example, the node labeled "$S1_1$" performs operations on characteristic values associated with the first segment in the first stroke, while the node labeled "$S1_2$" performs operations on characteristic values associated with the second segment in the first stroke. The node labeled "$S2_1$" then performs operations on characteristic values associated with the first segment in the second stroke.

As seen in this figure, the intermediate layer node $S1_4$ employs the results produced by the input layer nodes $S1_3$ and $S1_5$ for adjacently ordered segments. Thus, the operation results produced by the intermediate layer node $S1_2$ are based upon values relating to the characteristics of adjacently ordered segments. Similarly, the intermediate layer node $S1_5$ employs the results produced by the input layer nodes $S1_4$ and $S2_1$ for adjacently ordered segments. In the output layer, the node $S1_5$ will then employ the results produced by the intermediate layer nodes $S1_4$ and $S2_1$ for adjacently ordered segments. Thus, the output results of the analysis of the fifth segment in the first stroke will depend upon the characteristics of four adjacently ordered segments: the third and fourth segments of the first stroke and the first and second segments of a different, second stroke. More generally, among five consecutively ordered segment 1, 2, 3, 4 and 5, the analysis of the third segment will depend upon characteristics of all five segments, regardless of whether the segments are part of the same stroke.

While the invention orders segments of late strokes so that they are properly associated with previously-formed related strokes in order to accurately display the text after it has been recognized, reordering of the late strokes may itself reduce the accuracy of the recognition process itself. More particularly, when a segment is analyzed, considering the characteristics of an adjacent segment that is part of a late stroke may cause the analyzed segment to be improperly recognized. Thus, in the example above, when recognizing the handwritten letter "s", it may not be useful to analyze the characteristics of the segment making up the apostrophe, even though that segment is ordered adjacent to the segments making up the letter "s."

To address this discrepancy, various embodiments of the invention employ different information for recognizing a segment. In particular, when recognizing a segment, these embodiments of the invention will analyze characteristics for the first preceding segment from the same stroke and the first subsequent segment from the same stroke. These embodiments will also analyze characteristics for the first preceding segment from another stroke (even if that segment is not ordered immediately adjacent to the stroke being recognized) and the first subsequent segment from another stroke (even if that segment is not ordered immediately adjacent to the stroke being recognized). As will be discussed in more detail below, the characteristics for each of these "neighboring" segments will include Boolean values that can be used to determine how the characteristics for the segment will be employed.

For example, some embodiments of the invention, the recognition of a segment will include the analysis of 18 characteristics from each of the segment being recognized and its four neighboring segments. These characteristics include 14 Chebychev values, a height value, a width value, an ending velocity value, an a ration of bottom to top arc length over the whole arc length. If a segment is absent (i.e., a space), then the analysis employs default values for the missing segment. The height and width characteristics of the center segment (i.e., the segment being recognized) are computed relative to the y-deviation of the segments. An additional four characteristics are evaluated for each of the four neighboring segments: delta-x and delta-y (computed between the respective reference points), x-overlap and a Boolean feature indicating the presence of the segment, for a total of 16 characteristics.

In addition, for the previously ordered segment that is part of the same stroke as the segment being recognized, a Boolean value is provided indicating whether it is the first segment of the stroke. Similarly, for the subsequently ordered segment that is part of the same stroke as the segment being recognized, a Boolean value is provided indicating whether it is the last segment of the stroke. For the previously ordered and subsequently ordered segments that are part of a different stroke than the segment being analyzed, the segment will be assigned a Boolean value to indicate whether it is the first segment of a stroke and a Boolean value to indicate whether it is the last segment of a stroke. Thus, this arrangement will provide an additional 6 characteristics for analysis.

The center segment is then assigned a Boolean value, which is TRUE if the center segment is part of the same stroke as the previously ordered segment. While this value may or may not improve the accuracy of the recognition of the center segment, it is used to ensure the reliable reconstruction of the whole ink upon completion of the recognition process. Thus, the total number of characteristics that may be analyzed per segment is 5*18+16+6+1=113.

Figure 13:
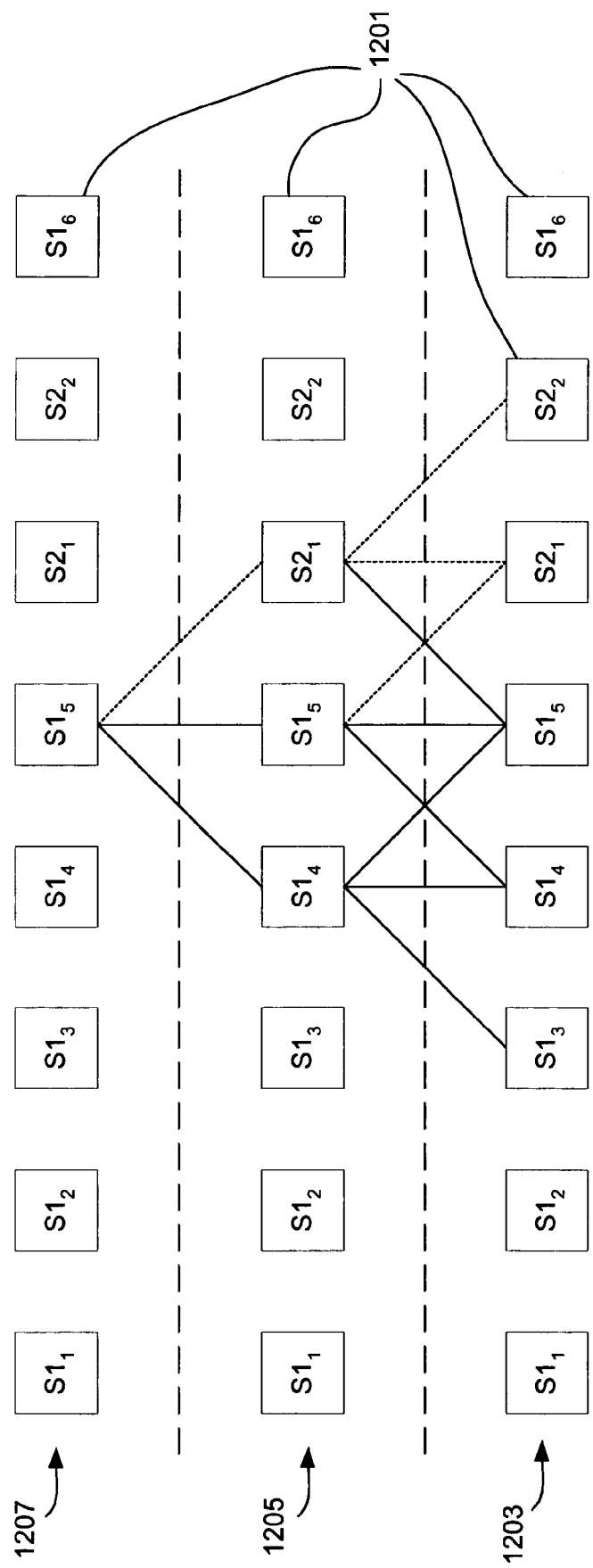

By using the Boolean values provided for adjacent segments, the neural network can determine when characteristics of adjacent segments should be considered during the recognition process. For example, by employing the Boolean values, various embodiments of invention can modify or even block the use of the characteristics of adjacently ordered segments from different strokes during the recognition process. Thus, as shown in FIG. 13, the Boolean values can be set so that the intermediate layer node $S1_5$ only employs the results produced by the input layer nodes $S1_4$ and $S1_5$. Similarly, the Boolean values can be set to that the output layer node only employs the results produced by the intermediate layer nodes $S1_4$ and $S1_5$. Thus, the results of the output layer node $S1_5$ will be independent from the characteristics of segments from other strokes, even if those segments have been adjacently ordered to the recognized segment.

CONCLUSION

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

That which is claimed is:

1. A method of arranging portions of writing strokes, comprising:
   partitioning a first writing stroke into at least one first segment;
   partitioning a second writing stroke into at least one second segment; and
   ordering the first segment and the second segment based upon a spatial relationship between the first segment and the second segment.

2. The method recited in claim 1, wherein the step of partitioning the first writing stroke includes:
   defining partition locations along the first writing stroke; and
   defining a reference point for the first segment.

3. The method recited in claim 2, wherein the partition locations are bottom points of the first writing stroke.

4. The method recited in claim 2, wherein the reference points are high points of the first segments.

5. The method recited in claim 2, wherein the reference point is a mid-point of the first writing stroke when the first writing stroke is a horizontal line.

6. The method recited in claim 1, wherein the step of ordering includes determining whether the second segment overlaps the first segment.

7. The method recited in claim 6, wherein the first segment and the second segment are ordered according to x-coordinate values when the first segment and the second segment do not overlap.

8. The method recited in claim 6, wherein the second segment is ordered after the first segment when the second segment is a straight line and intersects the first segment.

9. The method recited in claim 1, wherein the step of ordering includes determining whether x-coordinate values of the first segment are greater than x-coordinate values of the second segment.

10. The method recited in claim 9, wherein the second segment is ordered after the first segment when the x-coordinate values of the first segment are greater than the x-coordinate values of the second segment.

11. The method recited in claim 1, wherein the step of ordering includes:
    finding a segment low point of the first writing stroke that is closest to a reference point of the second segment; and
    ordering the second segment between segments of the first writing stroke on either side of the segment low point when the x-coordinate values of the first segment are less than x-coordinate values of the second segment.

12. The method recited in claim 11, wherein the order of the second segment is modified based upon features of the segments of the first writing stroke on either side of the segment low point.

13. The method recited in claim 1, further including a step of ordering the first writing stroke and the second writing stroke based upon a spatial relationship between the first writing stroke and the second writing stroke.

14. The method recited in claim 13, wherein the step of ordering the first writing stroke and the second writing stroke includes determining whether the first writing stroke completely overlaps the second writing stroke.

15. The method recited in claim 14, wherein the first writing stroke and the second writing stroke are ordered based upon x-coordinate values of the first writing stroke and the second writing stroke when the first writing stroke does not completely overlap the second writing stroke.

16. The method recited in claim 13, wherein the step of ordering the first writing stroke and the second writing stroke includes identifying a reference point for the first writing stroke and the second writing stroke when the first writing stroke completely overlap the second writing stroke.

17. The method recited in claim 16, wherein the step of ordering the first writing stroke and the second writing stroke includes ordering the first writing stroke before the second writing stroke when the first writing stroke is larger than the second writing stroke.

18. The method recited in claim 13, wherein the step of ordering the first writing stroke and the second writing stroke includes determining whether a threshold value is exceeded with regard to an amount of the first writing stroke with x-coordinate values that are larger than a reference point of the second writing stroke.

19. The method recited in claim 18, wherein the second writing stroke is ordered before the first writing stroke when the threshold value is exceeded.

20. The method recited in claim 18, wherein the first writing stroke is ordered before the second writing stroke when the threshold value is not exceeded.

21. A computer-readable medium having computer-executable instructions for performing steps of:
    ordering writing strokes based upon spatial relationships between the writing strokes;
    partitioning the writing strokes into segments;
    ordering the segments based upon spatial relationships between the segments; and
    analyzing the segments to associate characters with the segments.

22. The computer-readable medium recited in claim 21, wherein the step of ordering writing strokes includes determining whether the strokes completely overlap.

23. The computer-readable medium recited in claim 22, wherein strokes are ordered based upon x-coordinate values when the strokes do not completely overlap.

24. The computer-readable medium recited in claim 21, wherein the step of ordering writing strokes includes comparing sizes of the strokes and ordering larger strokes before smaller strokes.

25. The computer-readable medium recited in claim 21, wherein the step of ordering writing strokes includes determining an amount by which a larger one of the strokes with x-coordinate values that are larger than a reference point of a smaller one of the strokes.

26. The computer-readable medium recited in claim 25, wherein the smaller one of the strokes is ordered before the larger one the strokes when the amount exceeds a threshold value.

27. The computer-readable medium recited in claim 25, wherein the larger one of the strokes is ordered before the smaller one the strokes when the amount is less than a threshold value.

28. The computer-readable medium recited in claim 21, wherein the step of partitioning includes defining partition locations along the strokes and defining reference points for the segments.

29. The computer-readable medium recited in claim 28, wherein the partition locations are bottom points of the segments, and the reference points are top points of the segments.

30. The computer-readable medium recited in claim 28, wherein the reference points are mid-points of the strokes when the strokes are horizontal lines.

31. The computer-readable medium recited in claim 21, wherein the step of ordering the segments includes determining whether the segments overlap.

32. The computer-readable medium recited in claim 31, wherein the segments are ordered according to x-coordinate values when the segments do not overlap.

33. The computer-readable medium recited in claim 21, wherein the step of ordering the segments includes comparing x-coordinate values of the segments.

34. The computer-readable medium recited in claim 33, wherein a first of the segments is ordered after a second of the segments when an x-coordinate value of the second of the segments is greater than an x-coordinate value of the first of the segments.

35. The method recited in claim 21, wherein the step of ordering the segments includes modifying positions of segments based upon features of the adjacent segments.

* * * * *